United States Patent

[11] 3,586,375

| | | | | |
|---|---|---|---|---|
| [72] | Inventor | Alan E. Rathbun<br>3135 Highland Drive, Cuyahoga Falls,<br>Ohio 44224 | | |
| [21] | Appl. No. | 790,690 | | |
| [22] | Filed | Jan. 13, 1969 | | |
| [45] | Patented | June 22, 1971 | | |

[54] SPRING AND FOAM SEAT CONSTRUCTION
8 Claims, 3 Drawing Figs.

[52] U.S. Cl. ..................................................... 297/452
[51] Int. Cl. ..................................................... A47c 7/18
[50] Field of Search........................................ 297/452,
DIG. 1, DIG. 2, 445

[56] References Cited
UNITED STATES PATENTS

| | | | | |
|---|---|---|---|---|
| 2,283,116 | 5/1942 | Young.......................... | 297/DIG. 1 |
| 2,821,243 | 1/1958 | Toulmin....................... | 297/DIG. 2 |
| 3,005,213 | 10/1961 | Brown......................... | 297/452 |
| 3,165,308 | 1/1965 | Rathbun...................... | 267/111 |
| 3,263,987 | 8/1966 | Rathbun...................... | 267/103 |
| 3,310,300 | 3/1967 | Lawson....................... | 297/452 |

Primary Examiner—Reinaldo P. Machado
Attorney—Hamilton, Cook, Renner & Kenner

ABSTRACT: A spring and foam seat construction comprising a spring suspension having opposite side frame rods with spaced bands or straps extending between and connected to said rods and at least one bowed compression spring rod with its ends abutting said rods, and resilient foam material under said side frame rods and forming the sole means for supporting said spring suspension.

PATENTED JUN 22 1971    3,586,375

INVENTOR.
ALAN E. RATHBUN
BY Hamilton, Cook,
Renner & Kenner
ATTORNEYS 3,586,375

SPRING AND FOAM SEAT CONSTRUCTION

BACKGROUND OF THE INVENTION

The invention relates to seat constructions for use in vehicle seats, furniture and the like, in which comfort, durability and cost are important considerations. Spring seat suspensions having a spring frame formed of resilient rods with spaced strap means connecting two opposite rods and bowed compression rods with their ends abutting said opposite rods are disclosed in my prior U.S. Pat. Nos. 3,165,308 and 3,263,987.

In U.S. Pat. No. 3,165,308, the spring frame is supported directly on a rigid base frame so that the compression rods can flex within and with respect to the frame. In U.S. Pat. No. 3,263,987, one side of the spring frame is hinged directly on the rigid base while the opposite side is resiliently supported on the base by means of coil springs or a foam pad, it being stated that the hinge connections impart greatest comfort to the seating area without inducing pitch or sway.

I have now discovered that still further comfort can be obtained with such spring suspensions by supporting opposite sides of the suspension on a rigid base solely by means of foam and without any direct connection between the spring frame members and the rigid base. The foam preferably overlies the spring suspension and extends under the opposite spring frame members in substantial thickness so as to support them on a rigid base with no other connection between the base and the spring suspension. It is not necessary that the foam adhere to any part of the spring suspension nor that it extend across under the suspension, because the only function of the supporting foam portions under the spring frame members is to floatably support the seat when a load is applied thereto and thus augment and soften the spring action. When the top and sides of the foam are covered with the usual fabric stretched tautly thereover, no material amount of pitching or side sway occurs in a vehicle seat of this construction.

I am aware that in certain prior seat constructions, such as that shown in prior U.S. Pat. No. 3,329,466, to Getz, the spring frame and suspension structure are substantially entirely encased in foam, but in all such cases known to me the spring frame is directly supported on the rigid base. Any foam between the spring frame and the base is so thin as not to impart any material resiliency to the seat. In U.S. Pat. No. 3,329,466, the direct support for the spring frame is described in column 2, lines 54—59, as follows:

"Mounting 'feet' members integrally connected to the base frame could be provided so that the entire seat construction might be attached to a suitable pair of guide rails on which the seat is to be mounted to provide for adjustment of the seat."

In the Getz patented structure it is important that the foam be bonded or secured to at least the bottom surface of the flexible and load transferring fingers 20 and 30 which extend across the frame C and are connected to each other by rubber bands 25. When a load is applied to the seat, the foam material is placed in tension along with the fingers and stretched, and the load is transferred laterally through the foam. See column 3, line 63, to column 4, line 23 of the patent. Note that a considerable depth of resilient material below and bonded to the flexing fingers 20 and 30 is required. In all such prior constructions known to me the spring suspension comprises tension members held at their ends by a rigid spring frame which is directly supported on a fixed base frame.

SUMMARY OF THE INVENTION

Contrary to the concept and teaching of said Getz patent and other prior constructions, my construction does not require bonding to any part of the spring suspension nor to the underside of the load-transferring members, because the load is transferred laterally by the spaced straps to the side rods which can move laterally with respect to each other as controlled by compression of the bowed spring members, and the rods have no connection with the base. Thus, the foam under the side rods is subjected only to vertical compression by the downward movement of the whole spring suspension under load. This yielding compression supplements the spring action to achieve maximum comfort with substantial stability. Obviously, a foam having the required resilience in compression is much more economical to make than a foam having substantial strength in tension as required in said U.S. Pat. No. 3,329,466.

It is, therefore, a primary object of the present invention to provide a novel spring and foam seat construction which combines the unique bowed compression spring action of the suspension with the yielding compressive action of the supporting foam which is the sole support for the suspension.

DESCRIPTION OF A PREFERRED EMBODIMENT

Figure 1:
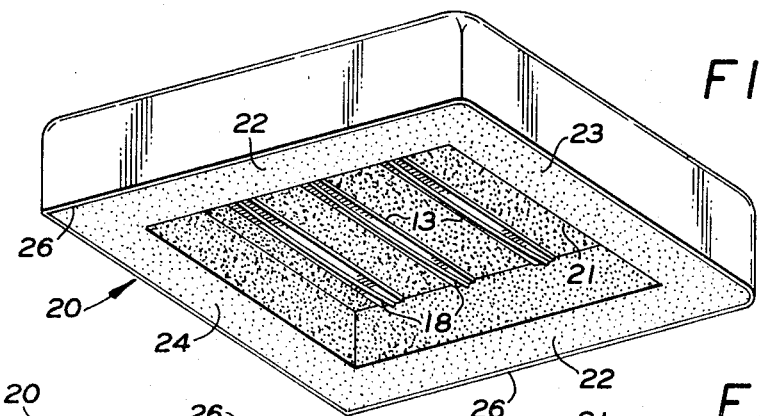
FIG. 1 is a detached bottom perspective view of a spring and foam seat construction unit showing the foam material surrounding the ends of the bowed spring compression rods and the portions thereunder for supporting the spring suspension with the intermediate portions of the suspension exposed and unsupported.

The spring suspension comprises opposite side frame resilient rods 10 and 11 which may be at the sides of the seat or at the front and rear as desired. The rods 10 and 11 may be connected by end rods (not shown) but this is not essential.

Extending between the rods 10 and 11 are laterally spaced straps 13 of webbing material, preferably thin metal bands of tempered steel which are flexible but substantially nonextensible. The bands 13 have their end portions wrapped around the rods 10 and 11 with the underlapping portions 14 extending under and secured to the bands in a suitable manner, as by spot welding or by staples 15, as shown.

Preferably, longitudinal tapes 16 connect the spaced-apart transverse straps 13 adjacent to and inwardly of the side rods 10 and 11. The tapes may be of suitable plastic material such polyethylene, and may extend parallel to the rods and between the overlapping portions 13 and 14 of the straps, and may be secured thereto by the staples 15.

The spring suspension may be of such dimensions as to provide a single seating area, as in a chair or individual seat, or it may be extended to provide a plurality of side-by-side seating areas as in a sofa or davenport, or in a bench-type automobile seat.

Figure 2:
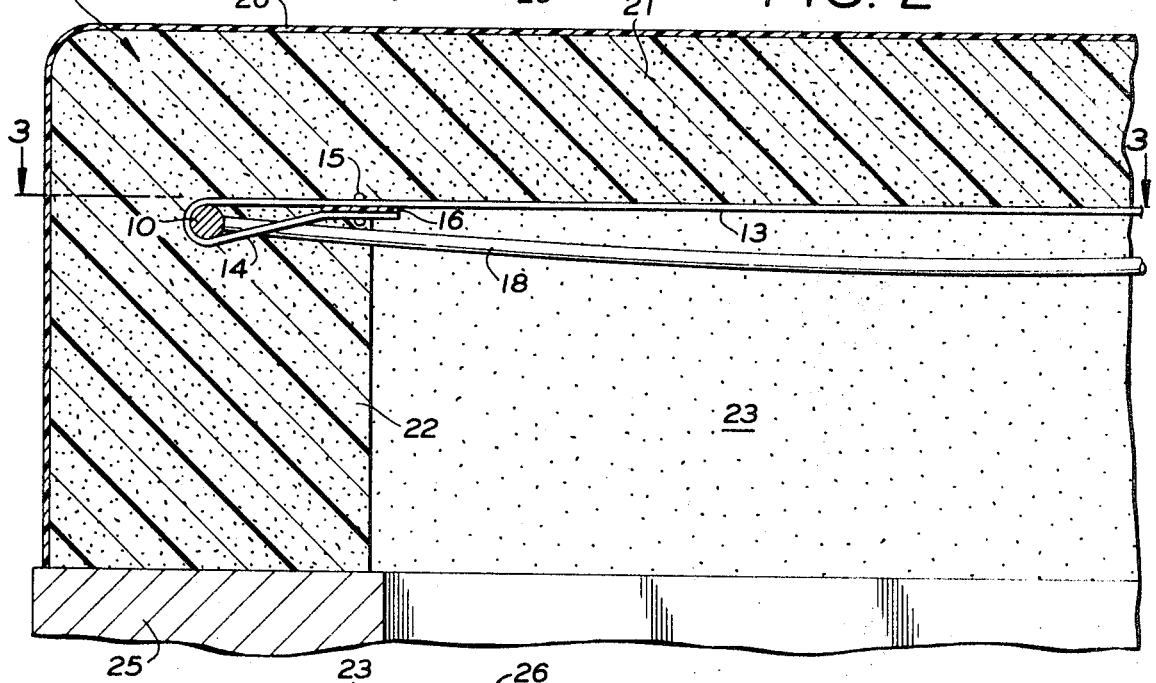
FIG. 2 is an enlarged partial vertical sectional view thereof.
Figure 3:
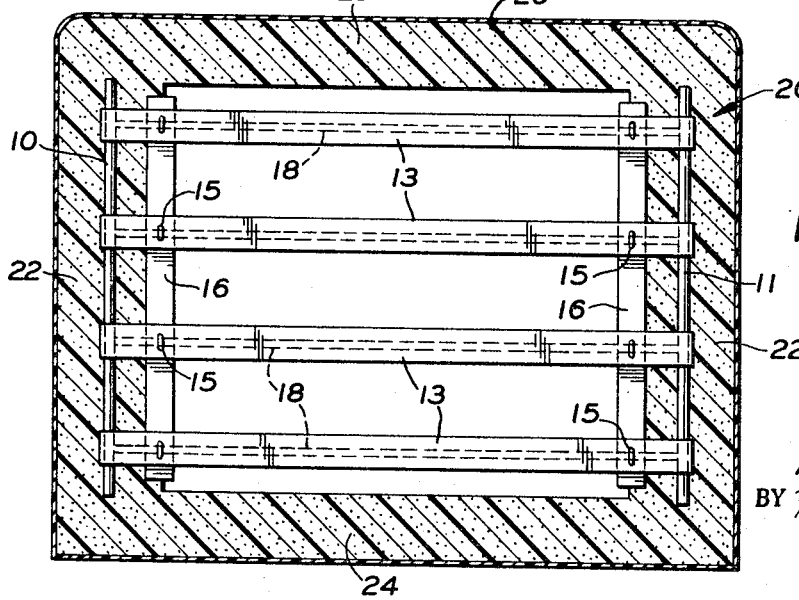
FIG. 3 is a plan view on line 3–3 of FIG. 2.

Bowed spring compression rod members 18 extend transversely between the side rods with the ends of rods 18 abutting the side rods 10 and 11 under sufficient compression to bow the rods 18 as shown in FIG. 2. As shown in FIG. 3, there is one bowed rod 18 under each strap 13, but the number and spacing of the rods 18 may vary. There should be at least one bowed spring rod 18 for each seating area.

As shown in FIG. 2, the ends of the compression rods 18 may extend through openings in the underlapping portions 14 of the straps 13 to position the rods 18. Where the rods 18 are between the straps 13, the ends of rods 18 may fit into notches in the side rods 10 and 11 or may be welded or otherwise fastened thereto.

The foam body indicated generally at 20 may be a synthetic plastic or rubber foam which is highly resilient in respect to compression loads but is not required to have substantial tensile strength. As an example, a bonded shredded polyurethane foam having a density on the order of 5 pounds per cubic foot has given highly satisfactory performance and is relatively inexpensive.

The single seat unit shown in the drawings has a foam body 20 which comprises a top layer 21 of foam overlying the entire spring suspension, and the foam surrounds the side and end portions of the suspension and forms marginal pads extending a substantial distance below the suspension. The side pads 22 are directly under the side frame rods 10 and are integral with front and rear pads 23 and 24, respectively, of the same depth so that the four marginal pads are adapted to rest on a flat rigid rectangular base 25, which may be open in the center as shown in FIG. 2.

The foam body 20 preferably has a bottom rectangular opening bounded by the four marginal pads exposing the underside of the spring suspension except for the sides and ends thereof. The top and four outer side surfaces of the foam body are covered by a suitable fabric 26 which may be bonded to said surfaces. If desired for appearance purposes, the underside of the spring suspension may be covered with fabric or other material 26 but such covering performs no other function.

When a load is applied to the top of the seat unit, the straps 13 flex and cause controlled yielding movement of the side rods 10 toward each other as controlled by the compression of the bowed spring rods 18. The flexing of the straps and movement of the bowed rods occurs in the open space under the spring suspension within the marginal foam pads, while downward movement of the spring suspension as a whole is yieldingly resisted by compression of the foam pads 22 under the side frame rods 10. It is apparent that the foam pads under the side rods 10 and the connected side portions of the suspension provide the sole means for supporting the spring suspension on the base 25. It is not necessary that the foam be bonded to the spring suspension but even if it were such foam acts only in compression and not in tension.

The particular combination of the spring suspension with foam produces a softened yet firm spring action with maximum comfort, and when the fabric covering 26 is applied to confine lateral movement of the foam no material amount of pitching or sidesway occurs when the improved unit is used as a vehicle seat.

I claim:

1. A spring and foam seat construction unit comprising a spring suspension supported in a foam body, said spring suspension having opposite side frame rods, spaced flexible straps extending between and connected to said side rods, and at least one bowed spring compression rod extending between and having its ends abutting said side rods, said foam body having pads of substantial thickness under said side frame rods providing the sole means for supporting said spring suspension on a base.

2. A spring and foam seat construction unit as in claim 1, in which the foam body extends over the top of the spring suspension.

3. A spring and foam seat construction unit as in claim 1, in which the foam body encloses said side rods.

4. A spring and foam seat construction unit as in claim 2, in which the foam body encloses said side rods.

5. A spring and foam seat construction unit as in claim 4, in which the underside of said spring suspension is uncovered between said pads.

6. A spring and foam seat construction unit as in claim 1, in which a fabric covering confines the outer sides of said pads.

7. A spring and foam seat construction unit as in claim 3, in which a fabric covering confines the outer sides of said pads.

8. A spring and foam seat construction unit as in claim 5, in which a fabric covering is applied to the top and outer sides of the foam body.